(12) United States Patent
Hasegawa et al.

(10) Patent No.: US 12,113,368 B1
(45) Date of Patent: Oct. 8, 2024

(54) SYSTEM, BASE STATION, TERMINAL APPARATUS, METHOD AND PROGRAM FOR PERFORMING COMMUNICATION AND WIRELESS POWER TRANSFER

(71) Applicant: SoftBank Corp., Tokyo (JP)

(72) Inventors: Naoki Hasegawa, Tokyo (JP); Yuta Nakamoto, Tokyo (JP); Takashi Hirakawa, Tokyo (JP); Yoshichika Ota, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/698,052

(22) PCT Filed: Aug. 31, 2022

(86) PCT No.: PCT/JP2022/032811
§ 371 (c)(1),
(2) Date: Apr. 3, 2024

(87) PCT Pub. No.: WO2023/058366
PCT Pub. Date: Apr. 13, 2023

(30) Foreign Application Priority Data

Oct. 8, 2021 (JP) ................. 2021-166123

(51) Int. Cl.
*H04J 3/00* (2006.01)
*H02J 50/20* (2016.01)
(Continued)

(52) U.S. Cl.
CPC ............. *H02J 50/20* (2016.02); *H02J 50/80* (2016.02); *H04L 27/0008* (2013.01); *H04L 27/361* (2013.01); *H04W 72/0446* (2013.01)

(58) Field of Classification Search
CPC ....... H02J 50/20; H02J 50/80; H04L 27/0008; H04L 27/361; H04W 72/0446
(Continued)

(56) References Cited

U.S. PATENT DOCUMENTS 11,923,693 B2* 3/2024 Cheng ................. H02J 50/80
2009/0247199 A1* 10/2009 Oodachi ............... H04B 5/00
455/500

(Continued)

FOREIGN PATENT DOCUMENTS

JP 2009-239640 A 10/2009
JP 2013-128236 A 6/2013
(Continued)

OTHER PUBLICATIONS

International Search Report and Written Opinion Dated for PCT Application No. PCT/JP2022/032811, Nov. 8, 2022.
(Continued)

*Primary Examiner* — Marceau Milord
(74) *Attorney, Agent, or Firm* — Muirhead and Saturnelli, LLC (57) ABSTRACT

Provided is a system comprising a base station and a terminal apparatus that communicate with each other by selectively using plural radio resources, which is capable of supplying a power to the terminal apparatus using a communication-unused radio resource between the base station and the terminal apparatus. The base station generates a transmission signal including a dummy signal for wireless power transfer using a communication-unused radio resource that is not used for communication among plural radio resources, and transmits the generated transmission signal to the terminal apparatus. The terminal apparatus receives the transmission signal including the dummy signal transmitted from the base station, and outputs an electric power of the reception signal as a reception power. A battery may be charged using the reception power.

20 Claims, 8 Drawing Sheets

(51) Int. Cl.
*H02J 50/80* (2016.01)
*H04L 27/00* (2006.01)
*H04L 27/36* (2006.01)
*H04W 72/0446* (2023.01)

(58) Field of Classification Search
USPC .......................................................... 370/336
See application file for complete search history.

(56) References Cited

U.S. PATENT DOCUMENTS

| | | | |
|---|---|---|---|
| 2017/0331330 A1* | 11/2017 | Yeo | H01Q 3/36 |
| 2019/0157912 A1* | 5/2019 | Taniguchi | H02J 50/20 |
| 2021/0105718 A1* | 4/2021 | Liu | H04W 76/28 |
| 2021/0152992 A1* | 5/2021 | Balasubramanian | H04W 68/02 |
| 2021/0167638 A1 | 6/2021 | Yahagi et al. | |
| 2021/0321255 A1* | 10/2021 | Faccin | H04W 28/065 |
| 2022/0046622 A1* | 2/2022 | Yang | H04W 76/28 |
| 2022/0046746 A1* | 2/2022 | Yang | H04W 52/0216 |
| 2022/0078779 A1 | 3/2022 | Xu et al. | |
| 2022/0124681 A1* | 4/2022 | Nguyen | H04W 74/0808 |
| 2022/0337084 A1* | 10/2022 | Elshafie | H02J 50/001 |

FOREIGN PATENT DOCUMENTS

| | | |
|---|---|---|
| JP | 2019-97302 A | 6/2019 |
| JP | 2014-079091 A | 5/2024 |
| KR | 10-2021-0061606 | 5/2021 |
| WO | WO 2017/164220 A1 | 9/2017 |
| WO | WO 2020/026412 A1 | 2/2020 |
| WO | WO 2020/131834 A1 | 6/2020 |
| WO | WO 2020/164437 A1 | 8/2020 |
| WO | WO 2021/154610 A1 | 8/2021 |

OTHER PUBLICATIONS

Notice for Reasons of Refusal for Japanese Patent Application No. 2021-166123, Dated Oct. 28, 2022.
Decision of Refusal for Japanese Patent Application 2021-166123, Dated Apr. 7, 2023.
Decision to Grant a Patent for Japanese Patent Application 2021-166123, Dated Sep. 13, 2023.
International Preliminary Report on Patentability Dated for PCT Application No. PCT/JP2022/032811, Apr. 9, 2024.
Japanese Notice of Reasons for Refusal, Dated Aug. 19, 2024.

* cited by examiner

FIG. 8 sion signal including the dummy signal for wireless power transfer to the terminal apparatus. The terminal apparatus of the foregoing system comprises a radio processing section for receiving the transmission signal including the dummy signal transmitted from the base station, and a power output section for outputting an electric power of a reception signal that is obtained by receiving the transmission signal including the dummy signal, as a reception power.

SYSTEM, BASE STATION, TERMINAL APPARATUS, METHOD AND PROGRAM FOR PERFORMING COMMUNICATION AND WIRELESS POWER TRANSFER

TECHNICAL FIELD

The present invention relates to a system, a method and a program for performing communication and wireless power transfer by selectively using plural radio resources.

BACKGROUND ART

There is conventionally known a communication system in which a communication is performed between a base station and a terminal apparatus using at least some of plural radio resources set in a radio frame (see, for example, Patent Literature 1).

CITATION LIST

Patent Literature

Patent Literature 1: International Publication No. 2017/164220.

SUMMARY OF INVENTION

Technical Problem

As a terminal apparatus that connects to a base station and communicates in a conventional communication system, there is a portable terminal apparatus that mainly uses an electric power supplied from a built-in battery. This terminal apparatus requires a complicated task of charging the built-in battery when its remaining capacity becomes low. A terminal apparatus that uses an electric power supplied from a wired-connection power line rather than the built-in battery is limited to use in a location where such power line is available. A power supply infrastructure, which can supply a power to various terminal apparatuses that connect to the base station and perform communication in this way, is not yet developed.

In the fifth generation and the subsequent next generation mobile communication systems, it is expected that the number of terminal apparatuses (for example, user apparatuses, IoT devices, etc.) that connect to base stations and communicate will rapidly increase, and a communication infrastructure is being developed to handle the huge amount of traffic. However, the power supply infrastructure capable of supplying a power to the huge number of terminal apparatuses that perform the above communication remains underdeveloped.

Solution to Problem

A system according to an aspect of the present invention is a system comprises a base station and a terminal apparatus that are capable of communicating with each other by selectively using plural radio resources. The base station of this system comprises a communication-signal processing section for generating a transmission signal including a dummy signal for wireless power transfer using a communication-unused radio resource that is not used for communication among the plural radio resources, and a radio processing section for transmitting the transmission signal including the dummy signal for wireless power transfer to A base station according to another aspect of the present invention is a base station capable of communicating with a terminal apparatus by selectively using plural radio resources. This base station comprises a communication-signal processing section for generating a transmission signal including a dummy signal for wireless power transfer using a communication-unused radio resource that is not used for communication among the plural radio resources, and a radio processing section for transmitting the transmission signal including the dummy signal for wireless power transfer to the terminal apparatus.

A terminal apparatus according to yet another aspect of the present invention is a terminal apparatus capable of communicating with a base station by selectively using plural radio resources. This terminal apparatus comprises a radio processing section for receiving a transmission signal including a dummy signal for wireless power transfer transmitted from the base station using a communication-unused radio resource that is not used for communication among the plural radio resources, and a power output section for outputting an electric power of a reception signal that is obtained by receiving the transmission signal including the dummy signal, as a reception power.

A method according to yet another aspect of the present invention is a method for performing a communication between a base station and a terminal apparatus by selectively using plural radio resources. This method comprises generating a transmission signal including a dummy signal for wireless power transfer using a communication-unused radio resource that is not used for communication among the plural radio resources, by the base station; transmitting the transmission signal including the dummy signal for wireless power transfer to the terminal apparatus, by the base station; receiving the transmission signal including the dummy signal transmitted from the base station, by the terminal apparatus; and outputting an electric power of a reception signal that is obtained by receiving the transmission signal including the dummy signal, as a reception power, by the terminal apparatus.

A program according to yet another aspect of the present invention is a program executed in a computer or processor provided in a base station capable of communicating with a terminal apparatus by selectively using plural radio resources.

This program comprises a program code for generating a transmission signal including a dummy signal for wireless power transfer using a communication-unused radio resource that is not used for communication among the plural radio resources, and a program code for transmitting the transmission signal including the dummy signal for wireless power transfer to the terminal apparatus.

A program according to yet another aspect of the present invention is a program executed in a computer or processor provided in a terminal apparatus capable of communicating with a base station by selectively using plural radio resources. This program comprises a program code for receiving a transmission signal including a dummy signal for wireless power transfer transmitted from the base station using a communication-unused radio resource that is not used for communication among the plural radio resources, and a program code for outputting an electric power of a reception signal that is obtained by receiving the transmission signal including the dummy signal, as a reception power.

In the foregoing system, the foregoing base station, the foregoing terminal apparatus, the foregoing method and the foregoing program, the terminal apparatus may have a battery that is charged using the reception power of the dummy signal.

In the foregoing system, the foregoing base station, the foregoing terminal apparatus, the foregoing method and the foregoing program, the terminal apparatus may perform a radio communication with the base station via an antenna for communication, and receive the transmission signal including the dummy signal from the base station via an antenna for reception power.

In the foregoing system, the foregoing base station, the foregoing terminal apparatus, the foregoing method and the foregoing program, the plural radio resources may include plural resource blocks defined by a subcarrier on a frequency axis and a slot on a time axis.

In the foregoing system, the foregoing base station, the foregoing terminal apparatus, the foregoing method and the foregoing program, the dummy signal for wireless power transfer may be a signal modulated at a symbol point with a maximum amplitude among plural symbol points of a digital modulation method. Herein, a primary modulation method of a transmission signal from the base station may be a QAM (Quadrature Amplitude Modulation) method and a secondary modulation method may be an OFDM (Orthogonal Frequency Division Multiplexing) method, and the dummy signal for wireless power transfer may be a signal modulated at a symbol point with a maximum amplitude among plural symbol points for the QAM method.

In the foregoing system, the foregoing base station, the foregoing terminal apparatus, the foregoing method and the foregoing program, the terminal apparatus may transmit power control information used for controlling the power transfer to the terminal apparatus, to the base station, and the base station may generate and transmit a transmission signal including the dummy signal based on the power control information received from the terminal apparatus. Herein, the power control information may include at least one kind of information among request information for requesting the power transfer to the terminal apparatus, identification information capable of identifying the terminal apparatus, location information of the terminal apparatus, remaining-amount information of a battery provided in the terminal apparatus and approval information for approving the power transfer to the terminal apparatus.

In the foregoing system, the foregoing base station, the foregoing terminal apparatus, the foregoing method and the foregoing program, for each of plural terminal apparatuses, a transmission signal including a dummy signal for wireless power transfer using the communication-unused radio resources may be generated, and the transmission signal including the dummy signal may be transmitted using beams that are different for each terminal apparatus.

Advantageous Effects of Invention

According to the present invention, it is possible to supply a power to a terminal apparatus by using a communication-unused radio resource between a base station and a terminal apparatus.

DESCRIPTION OF EMBODIMENTS

Hereinafter, embodiments of the present invention are described with reference to the drawings.

A system according to the embodiment described herein is a system that effectively utilizes communication-unused radio resources (resource blocks), which are not used for communication among plural radio resources (resource blocks) that are set in a downlink radio frame from a base station of mobile communication to a terminal apparatus (for example, IoT device with communication function), for a wireless power transfer (WPT) to the terminal apparatus. The system of the embodiment may be a radio communication system between the base station and the terminal apparatus, which has a wireless power transfer (WPT) function from the base station to the terminal apparatus. Further, the system of the embodiment may be a wireless power transfer (WPT) system from the base station to the terminal apparatus, which has a radio communication function between the base station and the terminal apparatus.

Figure 1:
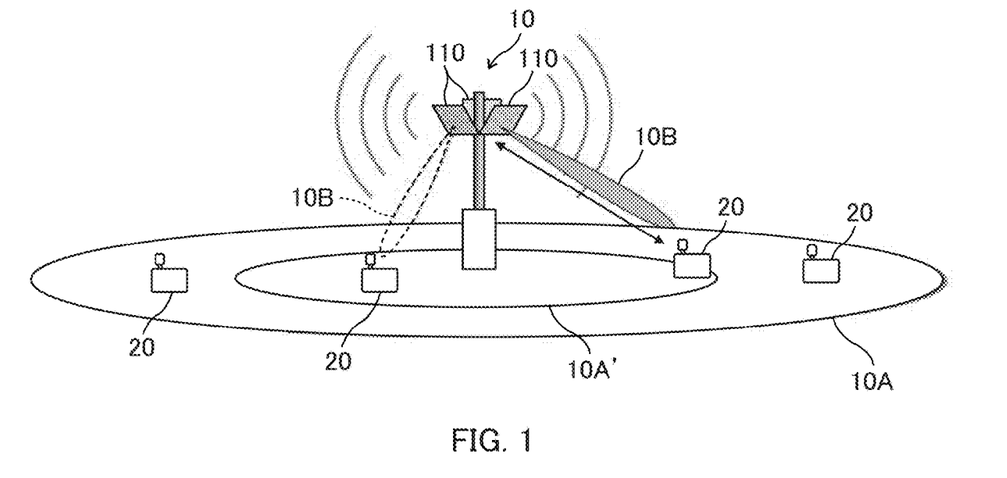
FIG. 1 is an illustration showing an example of a schematic configuration of a system according to an embodiment.

FIG. 1 is an illustration showing an example of a schematic configuration of the system according to the present embodiment. The system of the present embodiment includes a cellular-method base station 10 for forming a communication area (cell) 10A, and a terminal apparatus (hereinafter also referred to as "UE" (user equipment)) 20 that connects to the base station 10 and is capable of a radio communication with the base station 10 when locating in the communication area 10A.

The UE 20 may be a mobile station of a mobile communication system, or may be a combination of a communication apparatus (for example, a mobile communication module) and various kinds of devices.

In FIG. 1, the base station 10 is provided with plural array antennas 110 having a large number of antenna elements, and is capable of performing a communication of massive MIMO (hereinafter also referred to as "mMIMO") transmission method with plural UEs 20. The mMIMO is a radio transmission technology that achieves a high-capacity/high-speed communication by transmitting and receiving data using the array antenna 110. A communication can be performed using an MU (Multi User)-MIMO transmission method in which a beam forming is performed to form beams 10B in time division or simultaneously for each of the plural UEs 20. By performing the MU-MIMO transmission using the multi-element array antenna, it is possible to communicate by directing an appropriate beam for each UE 20 according to a communication environment of each UE 20, thereby the communication quality of the entire cell can be improved. Further, since it is capable of communicating with plural UEs 20 using the same radio resource (time/frequency resource), a system capacity can be expanded.

In FIG. 1, a part of the communication area 10A is a wireless power transfer area (hereinafter referred to as "WPT area") 10A' where a wireless power transfer is performed from the base station 10 toward the terminal apparatus 20. The WPT area 10A' may be a smaller area than the communication area 10A as shown in the figure, or may be an area having the same or approximately the same size and position as the communication area 10A.

In the WPT area 10A', communication-unused radio resources (resource blocks) that are not used for communication among the resource blocks, which are plural radio resources (time/frequency resources) constituting a downlink radio frame from the base station 10, are utilized as wireless-power transfer blocks. In the downlink radio frame to the UE 20, the base station 10 generates transmission signals in which a dummy signal for wireless power transfer (hereinafter also referred to as "dummy signal for WPT") is allocated to a wireless-power transfer block (WPT block) that is a communication-unused radio resource, and transmits the generated transmission signals to the UE 20.

Especially in the fifth generation or the subsequent next generation mobile communication systems, a technology called as a lean carrier is proposed, in which the minimum necessary reference signals (RS) and control signals are placed only on some subcarriers of a radio frame, and it is expected that the wireless power transfer to the UE 20 can be performed by effectively utilizing the part of the communication-unused radio resources in the radio frame.

Figure 2:
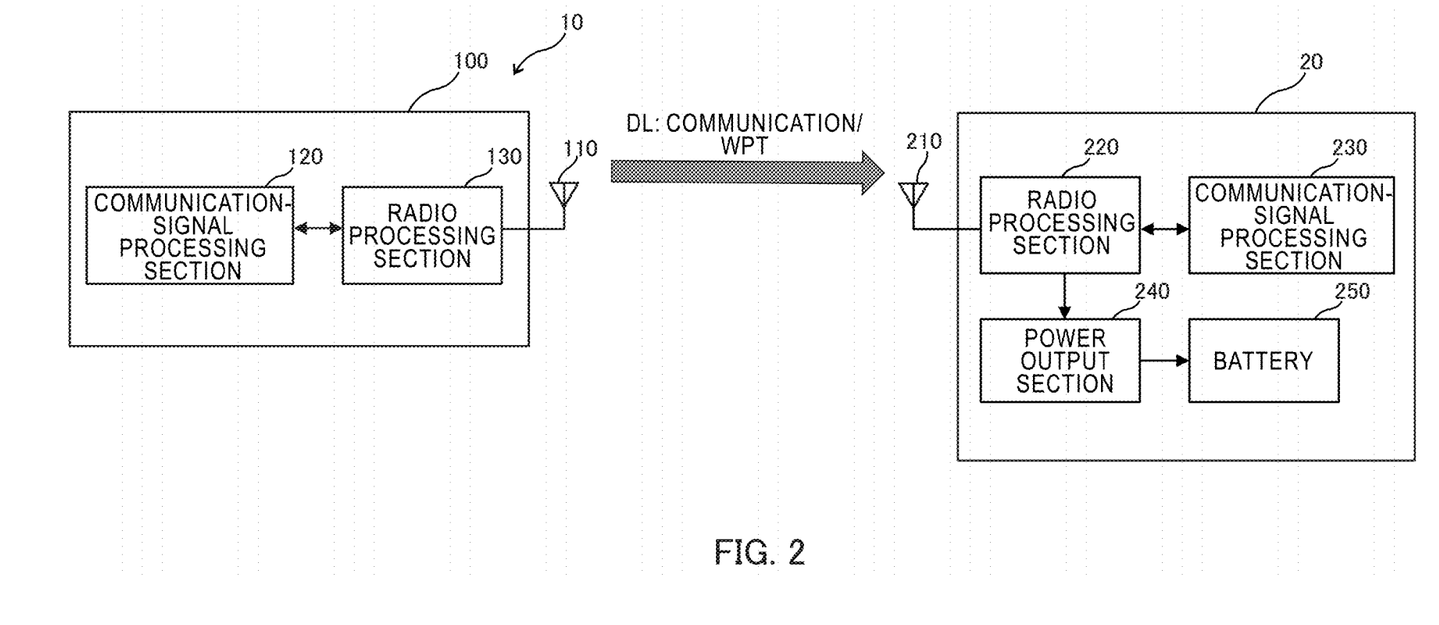
FIG. 2 is a block diagram showing an example of main configurations of a base station and a terminal apparatus (UE) that configure the system according to the embodiment.

FIG. 2 is a block diagram showing an example of main configurations of the base station 10 and the terminal apparatus 20 that configure the system according to the present embodiment. The base station 10 is provided with a base station apparatus 100 and the antenna 110. The antenna 110 is, for example, an array antenna having a large number of antenna elements as shown in FIG. 1. The antenna 110 may be single or plural. For example, a plurality of the antennas 110 may be disposed corresponding to plural sector cells.

The base station apparatus 100 is provided with a communication-signal processing section 120 and a radio processing section 130. The communication-signal processing section 120 processes signals such as various kinds of user data and control information, etc., which are transmitted to and received from the UE 20. The radio processing section 130 transmits the transmission signal generated by the communication-signal processing section 120, from the antenna 110 to the UE 20, and outputs the reception signal received from the UE 20 via the antenna 110 to the communication-signal processing section 120.

Especially in the present embodiment, during a downlink communication to the UE 20, the communication-signal processing section 120 generates downlink transmission signals including the dummy signal for WPT by using a communication-unused radio resource that is not used for communications, among plural radio resources. The downlink transmission signals including the dummy signal for WPT can be generated by modulating with any type of modulation method.

For example, the dummy signal for WPT may be a signal modulated at a symbol point with the maximum amplitude among plural symbol points of a digital modulation method. For example, the generation of the transmission signal may include a primary modulation such as a QAM (Quadrature Amplitude Modulation), etc. and a secondary modulation such as an OFDM (Orthogonal Frequency Division Multiplexing) modulation, etc. Further, the process of including the dummy signal for WPT using communication-unused radio resources in the transmission signal of the downlink communication to the UE 20 may be performed autonomously by the base station 10, or may be performed based on a request or instruction from the UE 20 or a request or instruction from a management server.

In the present embodiment, the radio processing section 130 transmits the downlink transmission signals including the dummy signal for WPT generated by the communication-signal processing section 120, to the UE 20 via the antenna 110.

During the downlink communication to the UE 20, the base station 10 may perform a beam forming (BF) control to form an individual beam 10B for each UE 20 or for each UE group in the target area to which plural UEs 20 belong, and may perform a wireless power transfer for each UE 20 or for each UE group. The BF control for each UE 20 or for each UE group may be performed by a digital BF control in the frequency domain in the communication-signal processing section 120, or may be performed by the analog BF control in the radio processing section 130.

In FIG. 2, the UE 20 includes an antenna 210, a radio processing section 220, a communication-signal processing section 230, a power output section 240 and a battery 250. The radio processing section 220 transmits the transmission signal generated by the communication-signal processing section 230, from the antenna 210 to the base station 10, and outputs the reception signal received from the base station 10 via the antenna 210, to the communication-signal processing section 230.

Especially in the present embodiment, the radio processing section 220 receives the transmission signals including the dummy signal for WPT, which are transmitted from the base station 10. The power output section 240 includes, for example, a rectifier, and outputs an electric power of the reception signal that is obtained by receiving the transmission signals including the dummy signal for WPT from the base station 10, as a reception power for battery charging. The battery 250 can be charged by the reception power outputted from the power output section 240.

Figure 3A:
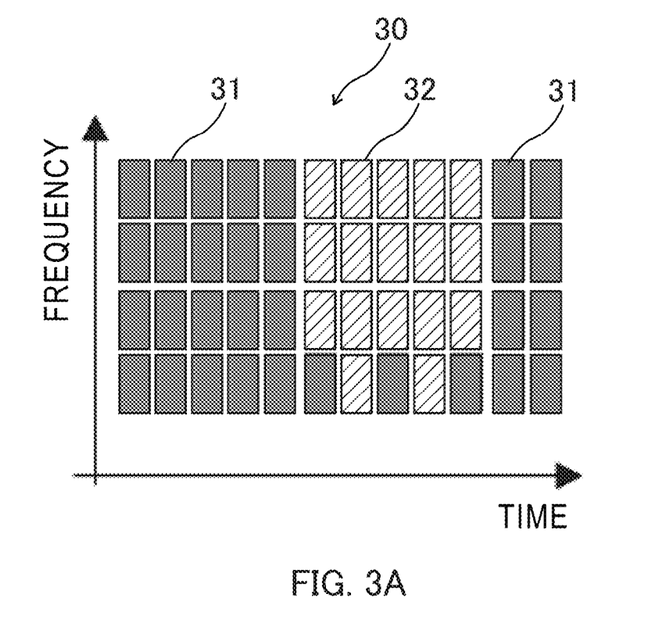
FIG. 3A is an illustration showing an example of allocation of WPT blocks in radio resources (resource blocks) of transmission signals including a dummy signal for WPT transmitted from the base station according to the embodiment.
Figure 3B:
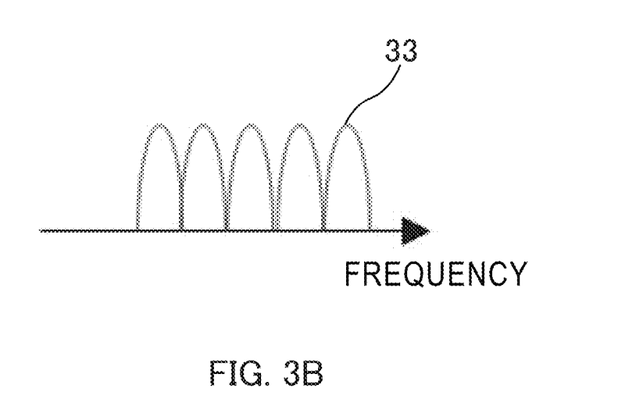
FIG. 3B is an illustration showing an example of a spectrum on a frequency axis in a secondary modulation of OFDM-method of a transmission signal transmitted from the base station according to the embodiment.

FIG. 3A is an illustration showing an example of allocation of WPT blocks in radio resources (resource blocks) of the transmission signals including the dummy signal for WPT transmitted from the base station 10 according to the present embodiment. Further, FIG. 3B is an illustration showing an example of a spectrum on a frequency axis in the secondary modulation of OFDM-method of the transmission signal transmitted from the base station 10 according to the present embodiment. As shown in FIG. 3A, plural radio resources used in the downlink communication in the system of the present embodiment are plural resource blocks 30 defined by subcarriers on the frequency axis and slots on the time axis. Each resource block 30 has a subcarrier 33 with a predetermined bandwidth, which are orthogonal to each other on the frequency axis as shown in FIG. 3B. A portion of the plural resource blocks 30 are used as resource blocks for communication 31, to which downlink communication signals are allocated, and the remaining portion indicated by hatching in the figure are used as WPT blocks 32.

Figure 4:
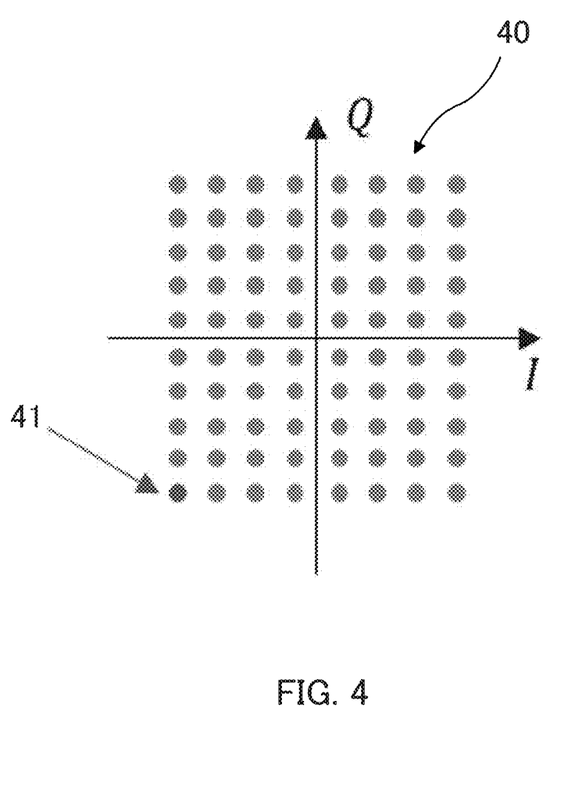
FIG. 4 is an illustration showing an example of arrangement of symbol points in a primary modulation of QAM-method of a transmission signal transmitted from the base station according to the embodiment.

FIG. 4 is an illustration showing an example of arrangement of symbol points 40 in the primary modulation of QAM-method of the transmission signal transmitted from the base station 10 according to the present embodiment. FIG. 4 is a diagram of a constellation showing an arrangement of plural symbol points (64-value symbol points) in the case of the 64QAM method, where the horizontal axis indicates the in-phase channel component and the vertical axis indicates the orthogonal channel component. In the present embodiment, the dummy signal for WPT modulated at any symbol point among the plural symbol points 40 of the QAM method can be used. For example, the dummy signal for WPT modulated at one of the outermost symbol points 41 having the maximum amplitude among the plural symbol points 40 of the QAM method may be used. In this case, the transmission power to the UE 20 can be maximized. Furthermore, for example, if it is not necessary to maximize the transmission power, the modulation may be performed at any symbol point other than the outermost symbol point. For example, the symbol point used for modulating the dummy signal for WPT may be determined and selected based on the transmission power indicated by power control information received from the terminal apparatus (UE) 20 such as an IoT device, etc. as described below, or the symbol points used for modulating the dummy signal for WPT may be determined and selected based on the battery-remaining-amount information included in the power control information received from the terminal apparatus (UE) 20.

According to the system in FIGS. 1 to 4, in the downlink communication from the base station 10 to the UE 20, the communication-unused radio resource can be effectively used as the wireless-power transfer block (WPT block) to perform the wireless power transfer (WPT) from the base station 10 to the UE 20.

Figure 5:
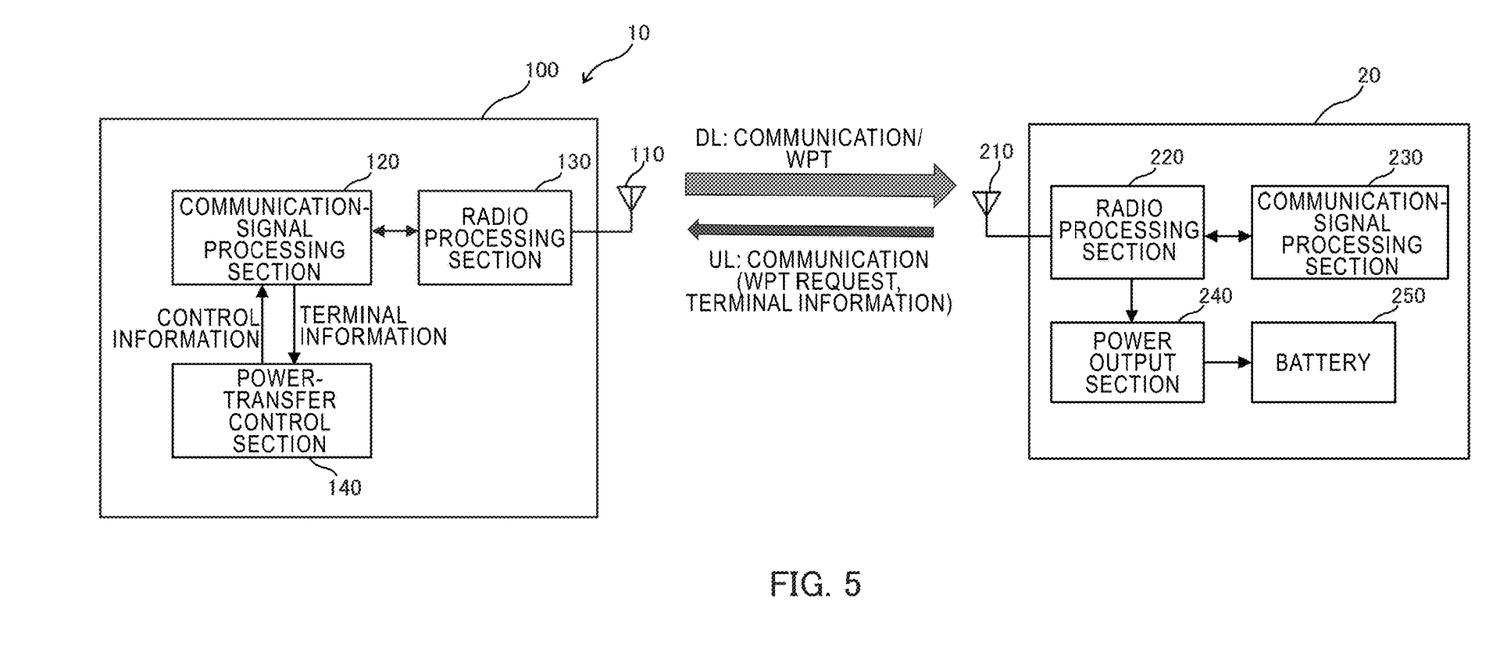
FIG. 5 is a block diagram showing another example of a main configuration of the base station and the terminal apparatus (UE) according to the embodiment.

FIG. 5 is a block diagram showing another example of a main configuration of the base station 10 and the terminal apparatus (UE) 20 according to the present embodiment. The example in FIG. 5 is an example of a system capable of controlling the wireless power transfer based on the information uploaded from the UE 20 to the base station 10. It is noted that, in FIG. 5, parts common to those in the system of FIG. 2 are designated by the same reference numerals, and the explanations thereof are omitted.

In FIG. 5, the UE 20 transmits power control information used for controlling the power transfer from the base station 10 to the UE 20, to the base station 10, by the uplink communication, and the base station 10 generates the transmission signals including the dummy signal for WPT based on the power control information received from the UE 20 and transmits the generated transmission signal to the UE 20.

The base station apparatus 100 is provided with a power-transfer control section for controlling the communication-signal processing section 120 to generate the transmission signals including the dummy signal for WPT based on the power control information received from the UE 20 and to transmit the generated transmission signals.

The power control information includes, for example, at least one kind of information among request information requesting the wireless power transfer to the UE 20 (hereinafter also referred to as "WPT request") and terminal information. The terminal information is, for example, at least one kind of identification information capable of identifying the UE 20, location information of the UE 20, remaining-amount information of the battery 250 provided in the UE 20 and approval information for approving the power transfer to the UE 20.

In the system of FIG. 5, for example, upon receiving the WPT request and the terminal information by the uplink communication from the UE 20, the base station 10 uses the WPT request as a trigger to start controlling the wireless power transfer to the UE 20.

Herein, for example, if the terminal information includes the identification information, the power-transfer control section 140 of the base station 10 can refer to the terminal database based on the identification information, and determine whether the UE 20 that has transmitted the WPT request is a UE targeted for wireless power transfer or a permitted UE, and control so as to include the dummy signal for WPT in the transmission signals only when the determination is affirmative.

Moreover, for example, if the terminal information includes the location information of the UE 20, the power-transfer control section 140 of the base station 10 can control so as to include the dummy signal for WPT in the transmission signals only when the UE 20 is located in a pre-permitted area, based on the location information.

Further, for example, if the terminal information includes the remaining-amount information of the battery 250 of the UE 20, the power-transfer control section 140 of the base station 10 can control to increase the number of dummy signals for WPT included in the transmission signal when the remaining amount of the battery 250 is low, and control to decrease the number of dummy signals for WPT included in the transmission signal when the remaining amount of the battery 250 is large, based on the remaining-amount information. [0045] furthermore, for example, if the terminal information includes the approval information of the UE 20, the power-transfer control section 140 of the base station 10 can control so as to include the dummy signal for WPT in the transmission signals only when the forgoing UE 20 is the UE 20 approved in advance, based on the approval information.

Figure 6:
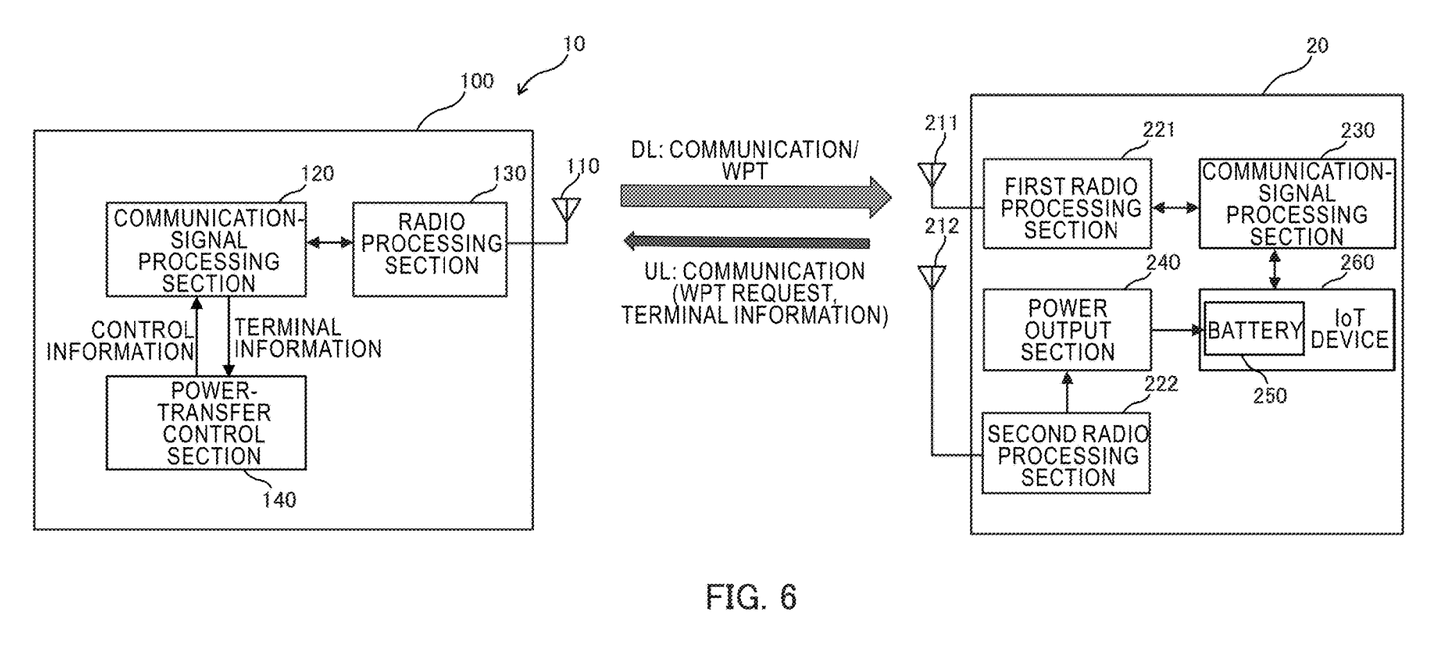
FIG. 6 is a block diagram showing yet another example of a main configuration of the base station and the terminal apparatus (UE) according to the embodiment.

FIG. 6 is a block diagram showing yet another example of a main configuration of the base station 10 and the terminal apparatus (UE) 20 according to the present embodiment. The example in FIG. 6 is an example of a system, in which the UE 20 is provided with an antenna and a radio processing section for wireless power transfer, and the system includes an IoT device 260 having the battery 250. It is noted that, in FIG. 6, parts common to the systems of FIGS. 2 and 5 are denoted by the same reference numerals, and the explanations thereof are omitted.

In FIG. 6, the UE 20 is provided with a first-radio processing section 221 for performing a radio communication with the base station 10 via an antenna for communication 211, and a second-radio processing section 222 for receiving transmission signals including the dummy signal for WPT from the base station 10 via an antenna for reception power 212. The communication-signal processing section 230 generates communication transmission signals of data and control information, etc. and outputs the communication transmission signals to the first-radio processing section 221, and processes the reception signals received via the antenna for communication 211 and the first-radio processing section 221, and outputs the data, the control information, etc. to the IoT device 260.

The second-radio processing section 222 receives the transmission signals including the dummy signal for WPT transmitted from the base station 10 via the antenna for reception power 212, and passes the transmission signals to the power output section 240. The power output section 240 includes, for example, a rectifier, and outputs the electric power of the reception signal that is obtained by receiving the transmission signals including the dummy signal for WPT from the base station 10, as a reception power for battery charging. The battery 250 built into the IoT device 260 can be charged by the reception power outputted from the power output section 240.

Figure 7:
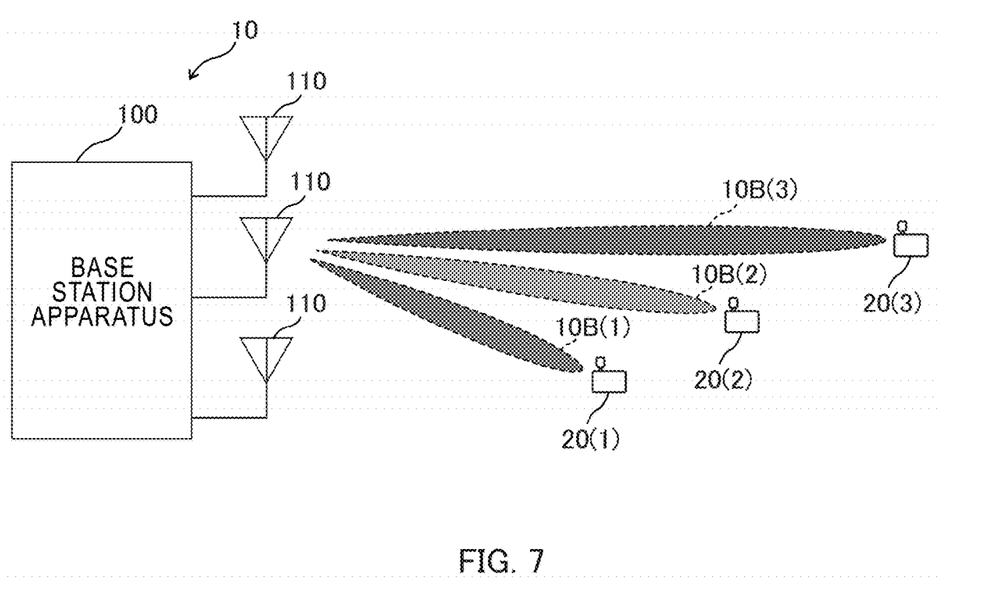
FIG. 7 is an illustration showing an example of power supply for respective terminal apparatuses (UEs) by a beam forming from the base station to plural terminal apparatuses (UEs) according to the embodiment.
Figure 8:
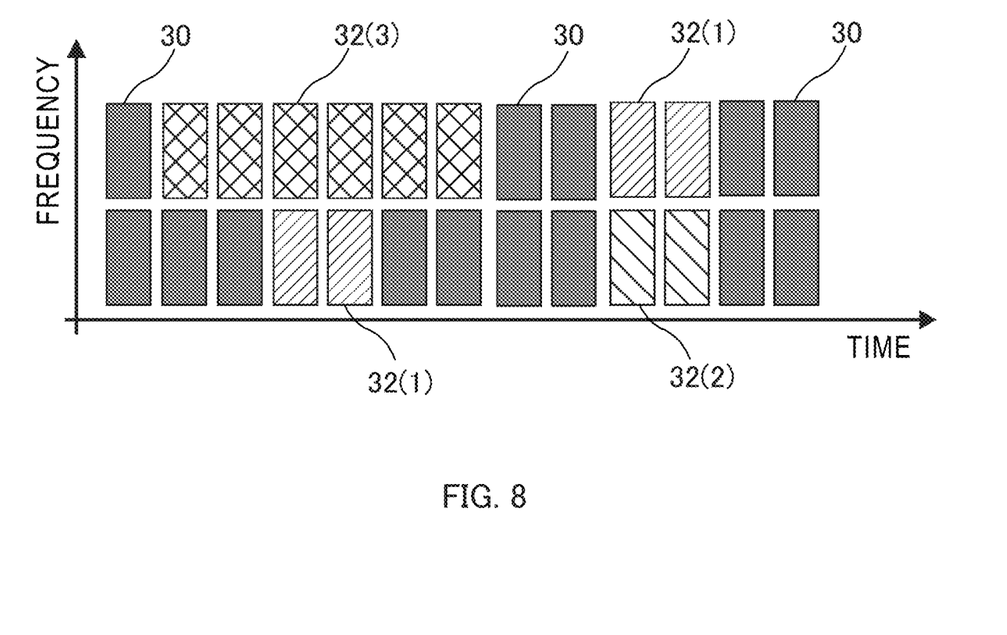
FIG. 8 is an illustration showing an example of allocation of WPT blocks when supplying power for respective terminal apparatuses (UEs) by the beam forming in FIG. 7.

FIG. 7 is an illustration showing an example of power supply for respective UEs by a beam forming from the base station 10 to plural UEs 20 according to the present embodiment. FIG. 8 is an illustration showing an example of allocation of WPT blocks when supplying power for respective UEs by the beam forming in FIG. 7. FIGS. 7 and 8 show an example in which plural UEs 20(1) to 20(3) are located in the WPT area 10A' (see FIG. 1 described above) within the communication area 10A, and supplies power for respective UEs 20(1) to 20(3) via the beams 10B(1) to 10B(3) that are respectively formed for the UEs.

In FIG. 7, the base station apparatus 100 of the base station 10 performs a beam forming (BF) control for each UE in the communication-signal processing section 120 or the radio processing section 130. The WPT blocks can be allocated to each UE, for example, as shown in FIG. 8. In FIG. 8, a portion of the plural resource blocks 30 used in downlink communication is used as resource blocks for communication 31, to which downlink communication signals are allocated. Then, among the remaining portions of the plural resource blocks 30, four pieces of WPT blocks 32(1) marked with first hatching in the figure are used for a power supply to the first UE 20(1) via the beam 10B(1), and two pieces of WPT blocks 32(2) marked with second hatching are used for a power supply to the second UE 20(2) via the beam 10B(2). Further, six pieces of WPT blocks 32(3) marked with cross hatching in the figure are used for a power supply to the third UE 20(3) via the beam 10B(3).

As described above, according to the present embodiment, it is possible to supply a power to the UE (terminal apparatus) 20 by using the communication-unused radio resource between the base station 10 and the UE (terminal apparatus) 20.

It is noted that, the process steps and configuration elements of the system described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, base station apparatus (Node B, Node G), terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: base station
10A: communication area
10A': WPT area
10B: beam
20: terminal apparatus
30: resource block
31: resource block for communication
32: WPT block (block for wireless power transfer)
32(1) to 32(3): WPT block (block for wireless power transfer)
33: subcarrier
40: symbol point 41: symbol point
100: base station apparatus
110: antenna, array antenna
120: communication-signal processing section
130: radio processing section
140: power-transfer control section
210: antenna
211: antenna for communication
212: antenna for reception power
221: first-radio processing section
222: second-radio processing section
230: communication-signal processing section
240: power output section
250: battery
260: IoT device

The invention claimed is:

1. A system comprising a base station and a terminal apparatus capable of communicating with each other by selectively using plural radio resources,
wherein the base station comprises:
a communication-signal processing section for generating a transmission signal including a dummy signal for wireless power transfer, the dummy signal being modulated at a symbol point selected for wireless power transfer among plural symbol points of a digital modulation method for downlink communication to the terminal apparatus, by using a communication-unused radio resource that is not used for communication among the plural radio resources in a downlink radio frame for communication to the terminal apparatus; and
a radio processing section for transmitting the transmission signal including the dummy signal for wireless power transfer to the terminal apparatus, and
wherein the terminal apparatus comprises:
a radio processing section for receiving the transmission signal including the dummy signal transmitted from the base station; and
a power output section for outputting an electric power of a reception signal that is obtained by receiving the transmission signal including the dummy signal, as a reception power, and
wherein the terminal apparatus is wirelessly power-supplied using the communication-unused radio resource in the downlink radio frame for communication to the terminal apparatus.

2. The system according to claim 1,
wherein the terminal apparatus comprises a battery that is charged using the reception power.

3. The system according to claim 1,
wherein the terminal apparatus comprises:
a first-radio processing section for performing a radio communication with the base station via an antenna for communication; and
a second-radio processing section for receiving the transmission signal including the dummy signal from the base station via an antenna for reception power.

4. The system according to claim 1,
wherein the plural radio resources include plural resource blocks defined by a subcarrier on a frequency axis and a slot on a time axis.

5. The system according to claim 1,
wherein the dummy signal for wireless power transfer is a signal modulated at a symbol point with a maximum amplitude among plural symbol points of a digital modulation method.

6. The system according to claim 5,
wherein a primary modulation method of the transmission signal from the base station is a QAM (Quadrature Amplitude Modulation) method,
wherein a secondary modulation method is an OFDM (Orthogonal Frequency Division Multiplexing) method, and
wherein the dummy signal for wireless power transfer is a signal modulated at a symbol point with a maximum amplitude among plural symbol points for the QAM (Quadrature Amplitude Modulation) method.

7. The system according to claim 1,
wherein the terminal apparatus transmits power control information used for controlling the power transfer to the terminal apparatus, to the base station, and
wherein the base station generates and transmits a transmission signal including the dummy signal based on the power control information received from the terminal apparatus.

8. The system according to claim 7,
wherein the power control information includes at least one kind of information among request information for requesting the power transfer to the terminal apparatus, identification information capable of identifying the terminal apparatus, location information of the terminal apparatus, remaining-amount information of a battery provided in the terminal apparatus and approval information for approving the power transfer to the terminal apparatus.

9. The system according to claim 1,
wherein the base station:
generates, for each of plural terminal apparatuses, the transmission signal including the dummy signal for wireless power transfer using the communication-unused radio resources; and
transmits the transmission signal including the dummy signal using plural beams that are different for each terminal apparatus.

10. A base station for communicating with a terminal apparatus by selectively using plural radio resources, comprising:
a communication-signal processing section for generating a transmission signal including a dummy signal for wireless power transfer, the dummy signal being modulated at a symbol point selected for wireless power transfer among plural symbol points of a digital modulation method for downlink communication to the terminal apparatus, by using a communication-unused radio resource that is not used for communication among the plural radio resources in a downlink radio frame for communication to the terminal apparatus; and
a radio processing section for transmitting the transmission signal including the dummy signal for wireless power transfer to the terminal apparatus, and
wherein the base station wirelessly supplies power to the terminal apparatus using the communication-unused radio resource in the downlink radio frame for communication to the terminal apparatus.

11. The base station according to claim 10,
wherein the dummy signal for wireless power transfer is a signal modulated at a symbol point with a maximum amplitude among plural symbol points of a digital modulation method.

12. A terminal apparatus for communicating with a base station by selectively using plural radio resources, comprising:

a radio processing section for receiving a transmission signal including a dummy signal for wireless power transfer transmitted from the base station, the dummy signal being modulated at a symbol point selected for wireless power transfer among plural symbol points of a digital modulation method for downlink communication to the terminal apparatus, by using a communication-unused radio resource that is not used for communication among the plural radio resources in a downlink radio frame for communication to the terminal apparatus; and a power output section for outputting an electric power of a reception signal that is obtained by receiving the transmission signal including the dummy signal, as a reception power, and wherein the terminal apparatus is wirelessly power-supplied using the communication-unused radio resource in the downlink radio frame for communication to the terminal apparatus.

13. The terminal apparatus according to claim 12, wherein the dummy signal for wireless power transfer is a signal modulated at a symbol point with a maximum amplitude among plural symbol points of a digital modulation method.

14. A system comprising a base station and a terminal apparatus capable of communicating with each other by selectively using plural radio resources, wherein the base station comprises:
a communication-signal processing section for generating, for each of plural terminal apparatuses, a transmission signal including a dummy signal for wireless power transfer, the dummy signal being modulated at a symbol point selected for wireless power transfer among plural symbol points of a digital modulation method for downlink communication to the terminal apparatus, by using a communication-unused radio resource that is not used for communication among the plural radio resources; and a radio processing section for transmitting the transmission signal including the dummy signal for wireless power transfer to the terminal apparatus, by using plural beams that are different for each terminal apparatus, and wherein the terminal apparatus comprises:
a radio processing section for receiving the transmission signal including the dummy signal transmitted from the base station; and a power output section for outputting an electric power of a reception signal that is obtained by receiving the transmission signal including the dummy signal, as a reception power.

15. The system according to claim 14, wherein the dummy signal for wireless power transfer is a signal modulated at a symbol point with a maximum amplitude among plural symbol points of a digital modulation method.

16. A system comprising a base station and a terminal apparatus capable of communicating with each other by selectively using plural radio resources, wherein the base station comprises:
a communication-signal processing section for generating a transmission signal including a dummy signal for wireless power transfer using a communication-unused radio resource that is not used for communication among the plural radio resources; and a radio processing section for transmitting the transmission signal including the dummy signal for wireless power transfer to the terminal apparatus, and wherein the terminal apparatus comprises:
a radio processing section for receiving the transmission signal including the dummy signal transmitted from the base station; and a power output section for outputting an electric power of a reception signal that is obtained by receiving the transmission signal including the dummy signal, as a reception power, and wherein the dummy signal for wireless power transfer is a signal modulated at a symbol point with a maximum amplitude among plural symbol points of a digital modulation method.

17. A base station for communicating with a terminal apparatus by selectively using plural radio resources, comprising:

a communication-signal processing section for generating a transmission signal including a dummy signal for wireless power transfer using a communication-unused radio resource that is not used for communication among the plural radio resources; and a radio processing section for transmitting the transmission signal including the dummy signal for wireless power transfer to the terminal apparatus, and wherein the dummy signal for wireless power transfer is a signal modulated at a symbol point with a maximum amplitude among plural symbol points of a digital modulation method.

18. A base station for communicating with a terminal apparatus by selectively using plural radio resources, comprising:

a communication-signal processing section for generating a transmission signal including a dummy signal for wireless power transfer, the dummy signal being modulated at a symbol point selected for wireless power transfer among plural symbol points of a digital modulation method for downlink communication to the terminal apparatus, by using a communication-unused radio resource that is not used for communication among the plural radio resources; and a radio processing section for transmitting the transmission signal including the dummy signal for wireless power transfer to the terminal apparatus, and wherein the base station:
generates, for each of plural terminal apparatuses, the transmission signal including the dummy signal for wireless power transfer using the communication-unused radio resources; and transmits the transmission signal including the dummy signal using plural beams that are different for each terminal apparatus.

19. The base station according to claim 18, wherein the dummy signal for wireless power transfer is a signal modulated at a symbol point with a maximum amplitude among plural symbol points of a digital modulation method.

20. A terminal apparatus for communicating with a base station by selectively using plural radio resources, comprising:

a radio processing section for receiving a transmission signal including a dummy signal for wireless power transfer transmitted from the base station using a communication-unused radio resource that is not used for communication among the plural radio resources in a downlink radio frame for communication to the terminal apparatus; and a power output section for outputting an electric power of a reception signal that is obtained by receiving the transmission signal including the dummy signal, as a reception power, and wherein the dummy signal for wireless power transfer is a signal modulated at a symbol point with a maximum amplitude among plural symbol points of a digital modulation method.

* * * * *